United States Patent Office 2,997,131
Patented Aug. 22, 1961

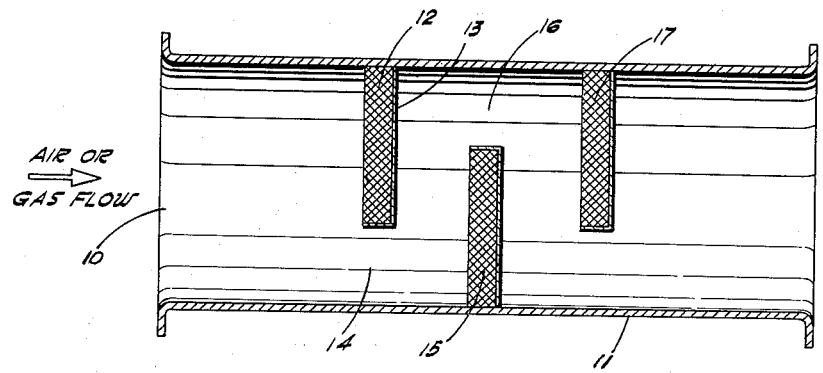
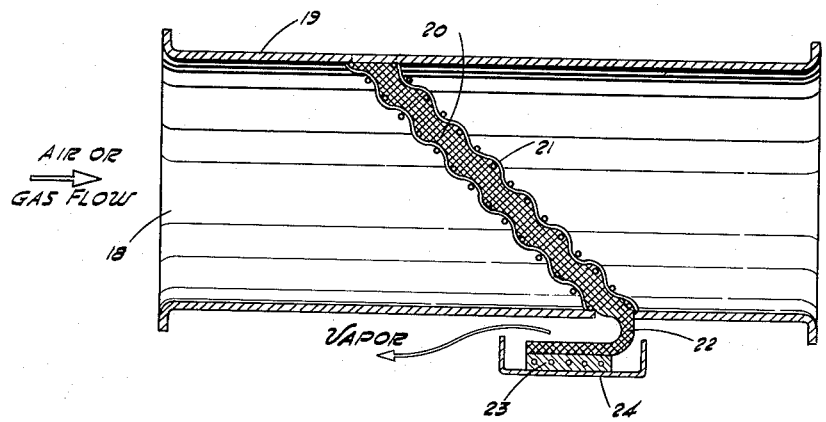

2,997,131
MOISTURE SEPARATOR
John T. Fisher, Indianapolis, Ind., assignor to Stewart-Warner Corporation, Chicago, Ill., a corporation of Virginia
Filed Sept. 4, 1957, Ser. No. 681,940
4 Claims. (Cl. 183—32)

This invention relates to an improved moisture separator which employs wick material to remove particles of liquid or moisture from an air or gas stream.

In many moisture separators of the prior art, moisture particles are removed from a gas stream by causing them to strike one or more baffles and to drop to the bottom of a passage. In other separators, spinners are employed to change the direction of the moisture particles so that these heavy particles can be separated by centrifugal force. The foregoing devices rarely remove all of the moisture, and in the usual instance only 90% to 99% of the moisture is removed.

Accordingly, a principal object of this invention is to provide an improved moisture separator which can be easily and economically fabricated and which can remove substantially all of the moisture contained in an air or gas stream.

A first embodiment of the separator of this invention employs an outer casing which encloses a gas or air passage. A series of baffles fabricated of wick material are suitably disposed within the casing. Each of the baffles is arranged in such a manner that it traps or obstructs a portion of the air passage while allowing air to flow through the unobstructed portion to strike another baffle.

In a second embodiment of the separator of this invention, a sheet of wick material is positioned within a casing so that gas flow must be through the wick. A portion of the wick extends outside of the casing and is thermally coupled to a heating device. This arrangement prevents wick saturation so that the separator is always effective.

In order that all of the features for attaining the objects of this invention may be readily understood, reference is herein made to the drawings wherein:

FIGURE 1 is a longitudinal sectional view of a first embodiment of this invention; and FIGURE 2 is a longitudinal sectional view of a second embodiment of this invention.

Referring now to the moisture separator shown in FIGURE 1, the air or gas containing free moisture in drop form of varying sizes enters the separators through inlet 10 of casing 11. A portion of this gas strikes the surface of wick material 12 which is formed as a baffle. This wick material is held in place by a suitable holder 13. A portion of the advancing stream passes through the opening 14 and thereafter strikes wick material 15 in the next baffle; the stream passes through opening 16 and strikes wick material 17 in the next baffle.

Wick baffles 12, 15, and 17 are shown as being straight sided objects. They may, however, be V-shaped or any other convenient shape that permits the exposure of a maximum surface to the air or gas stream. The wick material has a large number of capillary openings and therefore a large affinity for moisture. By suitable selection of the quantity of wick material and kind, the moisture separator may be designed to hold any desired capacity of moisture.

The wick material is preferably fabricated from an inert and fireproof substance such as fiber glass. For example, the fibrous silica insulation material manufactured and sold by the H. I. Thompson Fiber Glass Company of Los Angeles, California, under the tradename "Refrasil" is highly satisfactory as wick material for the separators described herein.

Referring now to the separator embodiment shown in FIG. 2, the air or gas containing moisture enters inlet 18 of casing 19 and strikes wick material 20. Wick material 20 obstructs the entire passage within casing 19. This wick material is retained by a suitable screen or open mesh 21 which allows the gas or air to pass therethrough and strike the wick 20. This passage of air or gas through the wick causes the free moisture to be completely absorbed by the wick.

A portion 22 of wick 20 is extended outside of the separator where it is placed in contact with any suitable heating element 23 disposed within holder 24. This heating element maintains a temperature higher than the boiling point of the absorbed liquid, thereby causing vapor to be boiled from its surface. Portion 22 of wick 20 is thus drier or less saturated with liquid than the portion within the casing. This difference in saturation causes the liquid to travel from that part of the wick within the casing to that portion 22 which contains less moisture, thus enabling the moisture separation process to be continuous.

The baffle wicks employed in the separator embodiment of FIG. 1 may be extended outside of casing 10 and thermally coupled to a heater, if it is desired to have this configuration operate continuously.

It is to be understood that the above-described arrangements are illustrative of the application of the principles of this invention. Numerous other arrangements may be devised by those skilled in the art without departing from the scope of the invention.

What is claimed is:

1. A moisture separator comprising a casing defining a fluid passage therein, a mass of wick material disposed in fixed relation within said casing and having a portion extending through an opening in said casing into the atmosphere, and a heater thermally coupled to the portion of the wick protruding into the atmosphere for heating the protruding wick portion to a temperature at or higher than the boiling temperature of water to continuously remove and dissipate moisture from the passage to the atmosphere.

2. The combination of claim 1 in which said mass of wick material fully obstructs the passage defined by said casing, and said wick material is fabricated of homogeneous fiber glass.

3. A moisture separator for separating moisture from a gas stream and dissipating the moisture to the atmosphere comprising a casing defining a fluid passage therein, a mass of fiber glass wick material disposed in fixed position within said casing and having a portion extending through said casing into the atmosphere, and a heater thermally coupled to the portion of the wick protruding into the atmosphere for heating the portion to rapidly evaporate moisture from the portion to the atmosphere.

4. A continuously operable moisture separator for separating moisture from a gas stream and dissipating the moisture to the atmosphere comprising a casing defining a fluid passage for the gas stream, a sheet of homogeneous fiber glass mounted in fixed position within the casing in the path of the gas stream, a portion of the fiber glass sheet extending through an opening in the casing and protruding into the atmosphere, and a heater in close proximity to the protruding fiber glass portion for raising the temperature of the protruding portion to evaporate the moisture therefrom to the atmosphere thus continuously causing the moisture absorbed by the fiber glass within the casing to flow toward the protruding portion for evaporation therefrom to the atmosphere.

(References on following page)

References Cited in the file of this patent

UNITED STATES PATENTS

| | | |
|---|---|---|
| 1,521,348 | Ambruster | Dec. 30, 1924 |
| 1,544,950 | Smith | July 7, 1925 |
| 1,926,262 | Campbell | Sept. 12, 1933 |
| 1,946,744 | Jones et al. | Feb. 13, 1934 |
| 2,134,544 | Ashley | Oct. 25, 1938 |
| 2,146,071 | Howath | Feb. 7, 1939 |
| 2,222,828 | Guthrie | Nov. 26, 1940 |
| 2,302,807 | Shoeld | Nov. 24, 1942 |
| 2,413,769 | Kasten | Jan. 7, 1947 |
| 2,629,459 | Hammond et al. | Feb. 24, 1953 |
| 2,801,707 | Asker | Aug. 6, 1957 |

FOREIGN PATENTS

| | | |
|---|---|---|
| 11,343 | Switzerland | Feb. 24, 1896 |
| 10,471 | Great Britain | May 6, 1904 |
| 531,515 | France | Oct. 25, 1921 |